United States Patent [19]

Kostelnik et al.

[11] Patent Number: 4,559,164

[45] Date of Patent: Dec. 17, 1985

[54] ELECTRICALLY CONDUCTIVE POLY(BUTYLENE TEREPHTHALATE) MOLDINGS AND COMPOSITIONS THEREFOR

[75] Inventors: Robert J. Kostelnik, Westchester; Allen D. Wambach, Newtown Square, both of Pa.

[73] Assignee: General Electric Company, Pittsfield, Mass.

[21] Appl. No.: 356,264

[22] Filed: Mar. 9, 1982

[51] Int. Cl.$^4$ ............................................. H01B 1/06
[52] U.S. Cl. ...................... 252/511; 252/502; 252/510; 524/495; 524/496; 524/604; 524/605; 525/496
[58] Field of Search ............ 252/511; 525/496; 524/495, 496, 605, 604

[56] References Cited

U.S. PATENT DOCUMENTS

| | | | |
|---|---|---|---|
| 2,379,976 | 7/1945 | Maddock | 260/41 |
| 3,833,685 | 9/1974 | Wambach | 260/860 |
| 4,034,013 | 7/1977 | Lane | 260/835 |
| 4,096,202 | 6/1978 | Farnham et al. | 260/873 |
| 4,237,244 | 12/1980 | Harpe et al. | 525/448 |
| 4,257,937 | 3/1981 | Cohen et al. | 260/40 R |
| 4,351,745 | 9/1982 | Stinger | 252/511 |

FOREIGN PATENT DOCUMENTS 079971  1/1978  Japan .

OTHER PUBLICATIONS

U.S. Ser. No. 290,879.

*Primary Examiner*—Paul Lieberman
*Assistant Examiner*—Hoa Van Le
*Attorney, Agent, or Firm*—John W. Harbour; William F. Mufatti; Edward K. Welch, II

[57] ABSTRACT

Poly(butylene terephthalate) injected molded articles which contain small uniformly distributed amounts of amorphous carbon or graphite powder, or graphitic carbon in the form of fibers, or any combination thereof, are electroconductive and possess decreased tendency to accumulate charges of static electricity. Minor amounts of glass fibers, polycarbonate resins and rubbery impact modifiers improve the electroconductivity imparted by the carbon.

11 Claims, No Drawings

ELECTRICALLY CONDUCTIVE POLY(BUTYLENE TEREPHTHALATE) MOLDINGS AND COMPOSITIONS THEREFOR

BACKGROUND OF THE INVENTION

The present invention relates to poly(butylene terephthalate) injection molded articles which contain one or more agents which render them electroconductive, and to compositions of matter useful for the production of said articles.

Poly(butylene terephthalate) is a plastic which has long been in commercial use because of its excellent resistance to chemicals, its great strength, and its resistance to fracture. In addition, the resin possesses extremely high electrical resistivity ($10^{15}$–$10^{16}$ ohms-cm), so that molded articles based on this resin find wide use where this property is important for example as housing for industrial, household and laboratory electrical motors and electrical devices including handtools and radio and television cabinets, and for insulating coatings on wires. Such articles usually contain one or more modifying agents, for example one or more rubbery polymers, to improve the resistance of the articles to impact; one or more reinforcing agents such as glass and nylon fibers to improve their tensile strength; stabilizes, for example, ZnO-ZnS mixtures, to improve the resistance of the articles to heat; and fire-retardants. Such agents have little or no effect on the electrical conductivity of the articles. Additional additives which can be present in molded articles based on poly(butylene terephthalate) are disclosed in copending application Ser. No. 957,801 filed on Nov. 6, 1978 by S. C. Cohen et al., which is hereby incorporated by reference.

In certain commercial and industrial applications it is desirable to provide a plastic injection molding composition which is electrically conductive. Heretofore, it is known that certain organic compounds, notably the condensation products of the higher fatty primary amines with ethylene oxide, are effective internal antistatic agents, but these agents have been found effective only in certain vinyl polymers, and it is generally believed that these agents are not effective in engineering plastics (see Modern Plastics Encyclopedia 1977-1978, pp. 145-146, McGraw-Hill, Inc., New York, N.Y. copyright 1977), hereby incorporated by reference.

It is also known (Maddock U.S. Pat. No. 2,379,976) that electrically conductive plastics based on vinyl chloride resins and plasticizers can be formulated by including in the composition from 30 to 40% by weight of finely divided carbon black. However, Maddock acknowledges that some sacrifice in the physical properties of the plastic result from incorporating such amount of carbon black, and that amounts of carbon black as low as 20% by weight are ineffective for the patentees purpose. Maddock also points out that electrically conductive compositions are known which contain natural or synthetic rubber and carbon black but that it is difficult in this manner to obtain compositions which are both conductive and elastic.

It has now been found that molding and extrusion compositions based on poly(butylene terephthalate) can be made electrically conductive so as to resist accumulation of static electricity by incorporating in the compositions relatively small amounts, i.e., 10 to 25% by weight of the composition, of finely divided amorphous carbon or graphite fibers, in which at least two of the dimensions are smaller than $100\mu$. Moreover, such filled compositions retain to a surprising degree the good physical properties, i.e., tensile strength and impact resistance, of the base poly(butylene terephthalate)-polymers.

The further important discovery has been made that certain additives, for example glass fibers, the polycarbonate of bisphenol A, and rubbery polymers which improve impact resistance, which heretofore have been thought to improve only certain physical properties of poly(butylene terephthalate) articles, in preferred instances, very greatly enhance the action of the carbon in rendering the articles electroconductive.

The carbon employed in the composition of the subject invention can be amorphous carbon powder of any of the commercially available type wherein the particles have diameters in the range of 0.1 millimicrons and 100 millimicrons. Preferably the amorphous carbon is pigmentary carbon, for example furnace black, acetylene black, channel black and lamp black, or any of the uncoated carbon blacks which are used as reinforcing agents in the compounding of rubber, wherein the particles have a maximum dimension between 0.2 microns and 2 microns.

Alternatively, the carbon can be in the form of graphite having an equivalent particle size. Graphite powder in the particle size range stated above is suitable, but it is generally preferred that the graphite be in the form of fibers or "whiskers" since in this form the graphite acts both as an anti-static agent and as a fibrous reinforcing agent which improves the tensile strength and impact resistance of the moldings. The preferred fibers have two dimensions in the range of not greater than about 127 microns each, their third dimension being a length not in excess of about 6.4 mm. The carbon can be present in combinations of the forms described above, and thus can be partly in fibrous and partly in powder form.

The action of the carbon in imparting electroconductivity to the compositions of the present invention is fortified by the presence of glass fibers, the polycarbonate of bisphenol A, and rubbery impact modifiers. The glass fibers are of the type customarily employed as reinforcing agents.

The rubbery impact modifier or mixture of modifiers can be a styrene-butadiene block copolymer or a styrene-butadiene-styrene block copolymer or a polyether ester, such as the "Hytrel" rubbers manufactured by duPont, as well as block copolymers having soft segments, such as poly(1,6-hexanediol-azelate-cophthalate) as claimed in application Ser. No. 290,879 filed Aug. 7, 1981, a continuation of application Ser. No. 752,325, filed Dec. 20, 1976. Also suitable as an impact modifier is a multiple stage polymer having a rubbery first stage and an epoxy functional hard final stage as shown in Lane, U.S. Pat. No. 4,034,013; or a multiphase composite interpolymer comprising a cross-linked acrylic first stage which also contains graftlinking monomer and a final rigid thermoplastic phase, as shown in Farnham et al., U.S. Pat. No. 4,096,202. The amounts of these agents, alone or in admixture, are in the range of 2-25% of the overall composition.

In certain preferred embodiments the composition includes electrically inert fillers, especially reinforcing fillers, for example clay, mica, talc and the like, of which clay is preferred. The fillers can be untreated or they can carry a coating of a siloxane or titanate coupling agent.

The glass filaments which are advantageously employed are well known to those skilled in the art and are widely available from a number of manufacturers. The preferred filaments are substantially composed of lime-aluminum borosilicate glass that is substantially soda-free. This is known as "E" glass. The filaments are made by standard processes, e.g., by steam, air or flame blowing or by mechanical pulling. The preferred filaments are made by mechanical pulling and have diameters from about 0.001" to about 0.0001".

The glass filaments which are added to the starting molding composition have any convenient length, for example ¼" to 2" or more, because they break extensively during the compounding operation. The lengths employed should be those which ensure that the fibers, just before the molding (including extrusion) step, are no longer than about ¼". Their final length can be as short as 0.0005".

The amount of the aforementioned fillers which can advantageously be present varies widely depending chiefly on the particular polymers and other materials which are present in the composition and on the specifications which the composition must meet, a suitable amount being that which is sufficient to provide a substantial reinforcement. Generally the weight of the reinforcing filler is between about 5% and 50% of the total composition. A suitable amount in any instance is readily found by trial.

Electroconductive articles of low combustibility can be produced according to the present invention by including in the starting compositions an effective amount of a conventional flame-retardant or mixture thereof. As is well known, flame retardants may be based on elementary red phosphorus, phosphorus compounds, halogen, and nitrogen compounds alone or preferably in admixture with synergists such as antimony compounds. Especially useful are the polymeric and oligomeric flame retardants which comprise tetrabromobisphenol A carbonate units (see Wambach, U.S. Pat. No. 3,833,685 which is incorporated herein by reference).

Other ingredients such as dyes, pigments, drip retardants and the like can be added for their conventional purposes.

The compositions may and advantageously will include such other components as heretofore have been present in poly(butylene terephthalate) molding compositions, for example 1% to 50% of polyethylene to improve the flexibility of the moldings, 1% to 50% of a compatible auxiliary polymer, for example poly(ethylene terephthalate) and poly(1,4-butylene isophthalate); mold lubricants; and stabilizers for protecting the molded article from heat.

The compositions of this invention can be prepared by ordinary melt blending procedures, and this is one of the advantages thereof. According to one such procedure, all the components are mixed simultaneously and the resulting batch is extruded to form a rod which is then chopped, providing granules of uniform composition.

It is important to free all of the ingredients, including the carbon, from as much water as possible before the composition is fused or molded.

The invention is further illustrated by the examples which follow. These examples are best embodiments of the invention and are not to be construed in limitation thereof. Parts are by weight except where otherwise stated.

EXAMPLE 1

A. A molding composition is formed by tumbling 100 parts of granulated poly(1,4-butylene terephthalate) resin (VALOX 310 of General Electric Co.) with 10 parts of pigmentary amorphous carbon black (Ketjenblack EC of Armak Co., Chicago, Ill.) having a particle size in the range of 0.2 millimicrons-2 millimicrons until a uniform mix is obtained. The mix is not only extruded as a rod, but the rod is pelletized and the pellets injection molded into appropriate test specimens.

B. The above procedure is repeated except that the carbon black is omitted. The extrudate of virgin poly(1,4-butylene terephthalate) has substantially the same strength and impact resistance as the carbon-containing rod, but its volume resistivity is in excess of $10^{16}$ ohms-cm.

EXAMPLE 2

Procedure A of Example 1 is repeated except that 30 parts of the poly(1,4-butylene terephthalate) resin are replaced by 30 parts of poly(ethylene terephthalate). The extrusion machine temperature is increased to 260° C. to melt mix the polyethylene terephthalate. A similar but more flexible product is obtained.

EXAMPLE 3

The following illustrate the effect of graphite fibers alone and with glass fibers in the production of molded articles which are electroconductive, in comparison with articles composed of poly(1,4-butylene terephthalate) alone and in admixture with one or more other polymers.

The glass and graphite fibers used are each about 0.005" in diameter and less than about ¼" in length. They are both commercial grade fibers which are sold for use in thermoplastic molding compositions.

The polymers used are commercial and are supplied in granular form.

In each instance the components shown in the table below are tumble mixed and the mixtures are extruded through a laboratory extruder working at 240° C. in the form of rods which are pelletized. The pellets were molded into standard test specimens and tested by standard laboratory method to determine their resistivity, as was done in Example 1. Runs 1 and 2 are controls. Results are as follows:

| Run | PBT[1] | Lexan[2] | KM-[3] 330 | Hytrel[4] 4056 | Glass | Graphite | Volume Resistivity Ohms.-cm |
|---|---|---|---|---|---|---|---|
| 1 | 100 | — | — | — | — | — | $6.9 \times 10^{14}$ |
| 2 | 100 | — | — | — | — | — | $5.3 \times 10^{14}$ |
| 3 | 100 | — | — | — | — | 10 | $3.4 \times 10^{14}$ |
| 4 | 100 | 15 | 15 | — | — | 10 | $5.7 \times 10^{13}$ |
| 5 | 100 | 15 | 15 | — | 20 | 10 | $5.7 \times 10^{5}$ |
| 6 | 100 | — | — | 20 | — | 15 | $1.2 \times 10^{7}$ |

[1] Poly(1,4-butylene terephthalate) (Valox 310, General Electric Co.).
[2] Polycarbonate of bisphenol A, (Lexan ®, General Electric Co.).
[3] A multiphase impact modifying interpolymer having a rubbery first phase and a thermoplastic rigid final phase (Acryloid-330, Rohm & Haas Co., Philadelphia, Pa.; see U.S. Pat. No. 4,096,202).
[4] A thermoplastic polyether polyester interpolymer of butylene oxide, butanediol and terephthalic acid, available from DuPont.

The above example demonstrates that glass fibers and other modifiers are very effective in increasing the conductivity of compositions containing graphite fibers; compare, for example, Run 3 with Runs 5 and 6.

EXAMPLE 4

The procedure of Example 1-A is repeated, the material used being as follows:

|  | PARTS | |
| --- | --- | --- |
| Run | Resin (Valox 310)[1] | Carbon Black |
| A | 14.25 | 0.75 |
| B | 13.25 | 1.5 |

[1]Poly(1,4-butylene terephthalate) resin

The mixtures are molded at 240° C. in a laboratory injection molder to form test pieces which have properties as follows:

| PROPERTIES | A | B |
| --- | --- | --- |
| Impact strength: | | |
| Izod, notched, ft.-lb./inch | 0.34 | 0.22 |
| Izod, unnotched, ft.-lb./inch | 2.5 | 1.6 |
| Gardner, impact, in-lbs: | | |
| Bottom | 4 | 4 |
| Top | 4 | 4 |
| Dislodge | 8 | 4 |
| Tensile strength, psi | 4,878 | 6,216 |
| Flexural: | | |
| Strength, psi | 15,030 | 10,665 |
| Modulus, psi | 419,167 | 464,482 |
| Elongation, % | 14 | 5 |
| Specific gravity | 1.335 | 1.353 |
| Deflection temp. under load, °C., 264 psi | 150 | 146 |
| Melt viscosity, poise | 10,557 | 17,152 |
| Shrink, mils/in., 4" × ⅛ disc | 17 | 17 |
| Volume resistivity, (ohms-cm.) | $5 \times 10^{14}$ | 3,000 |

The above example demonstrates that increasing the carbon black content of the composition from 5% to about 10% results in test specimens having remarkably increased conductivity (low resistivity) with only minor impairment of their physical properties, and, in some instances, an improvement in such properties.

EXAMPLE 5

A molding composition is formed by tumbling 80 parts of granulated poly(1,4-butylene terephthalate) resin (Valox 315 of General Electric) with 20 parts of a pigmentary amorphorus carbon black (Cabot XC-72, Boston, Ma) having a particle size of 30 millimicrons until a uniform mix is obtained. The mix is extruded and pelletized on a laboratory extrusion machine at 245° C. The pellets were molded into ⅛"×4" diameter discs which were glossy black in color and had a surface resistivity of 200 ohms/sq. cm.

The mixture was injection molded into test specimens which have properties as follows:

| Impact Strength: | |
| --- | --- |
| Izod, notched, ft. lb./in. | 0.46 |
| Izod, unnotched, ft. lb./in. | 5.60 |
| Gardner Impact, in-lbs. dislodge | 7 |
| Tensile strength lb./in.$^2$ | 8,693 |
| Flexural: | |
| strength, psi | 15,824 |
| modulus, psi | 452,250 |
| Specific gravity | 1.356 |
| Melt viscosity, poises (250° C.) | 11,011 |
| Surface resistivity, ohms/sq. cm. | 200 |

The above example when compared to Example 4 demonstrates that increasing the carbon black content of the composition from 10% to 20% results in test specimens having increased conductivity (low resistivity) with only minor impairment of their physical properties and in some instances, an improvement in such properties.

All of the patents, patent applications, and printed publications referred to above are hereby incorporated in this specification by reference. Obviously, other modifications and variations of the present invention are possible in the light of the above teachings. For example, the carbon-containing compositions can be rendered flame retardant, and other polymers can be present, for example polyethylene. It is therefore to be understood that changes may be made in the particular embodiments described above which are within the scope of the invention as defined in the appended claims.

What is claimed:

1. A plastic composition characterized by electroconductivity and comprising up to 90 wt.% poly(1,4-butylene terephthalate) resin, an amount of finely divided carbon intimately distributed throughout said composition sufficient to reduce volumn resistivity to a value of about $1.2 \times 10^7$ ohms/sq.cm and below and electroconductivity enhancing amount of an additive selected from the group consisting of from about 1 to about 50% the polycarbonate of bisphenol-A, from about 5 to about 50% glass fibers, from about 2 to about 25% rubbery polymers which improve impact resistance, and blends thereof, each of said additives being percentages by weight of the total composition.

2. A composition according to claim 1 in which the amount of carbon is about 10% by weight of the total composition.

3. A composition according to claim 1 wherein said carbon is graphite powder.

4. A composition according to claim 1 having a content of a polycarbonate of bisphenol A in the range of 1% to 50% based on the weight of the poly(butylene terephthalate) in said composition.

5. A composition according to claim 4 wherein the weight of said polycarbonate of bisphenol A is in the range of 5% to 25% based on the weight of thermoplastic resin in said composition.

6. A composition according to claim 1 further containing 1% to 50%, based on the total weight of the additives content of said composition, of said glass fibers, having diameters in the range of 0.001" to 0.0001" and lengths less than ¼ inch.

7. The plastic composition according to claim 1, which contains from about 5.9 to about 25% by weight said finely divided carbon.

8. A composition according to claim 1 wherein said carbon comprises amorphous carbon comprising particles having diameters 0.1 millimicrons to 100 millimicrons wide.

9. A composition according to claim 8 wherein said amorphous carbon comprises particles having diameters in the range of 0.2 millimicrons to 2 millimicrons wide.

10. A composition according to claim 1 wherein said carbon comprises graphite fibers having diameters not greater than about 127 microns wide and lengths less than about 6.4 mm.

11. A composition according to claim 1 wherein said rubbery polymer constitutes 2% to 25% by weight of the overall composition and is selected from the group consisting of a styrene-butadiene-styrene block copolymer, a polyether-ester, poly(1,6-hexanediol-azelate-cophthalate), a multiple stage polymer having a rubbery first stage and an epoxy functional hard final stage, a multiple composite interpolymer comprising a cross-linked acrylic first state and a final rigid thermoplastic phase, and blends thereof.

* * * * *